United States Patent
Keynan et al.

(10) Patent No.: US 8,228,814 B2
(45) Date of Patent: Jul. 24, 2012

(54) DPI MATRIX ALLOCATOR

(75) Inventors: Roni Keynan, Kfar Yona (IL); Natan Yaron, Hod Hasharon (IL); Rami Rozen, Bat Yam (IL); Nimrod Schnabel, Herzliya (IL); Ofer Shai, Elad (IL)

(73) Assignee: Allot Communications Ltd., Hod-Hasharon (IL)

( * ) Notice: Subject to any disclaimer, the term of this patent is extended or adjusted under 35 U.S.C. 154(b) by 30 days.

(21) Appl. No.: 12/452,120

(22) PCT Filed: Jun. 18, 2008

(86) PCT No.: PCT/IL2008/000829
§ 371 (c)(1),
(2), (4) Date: Aug. 19, 2010

(87) PCT Pub. No.: WO2008/155765
PCT Pub. Date: Dec. 24, 2008

(65) Prior Publication Data
US 2010/0309794 A1    Dec. 9, 2010

Related U.S. Application Data

(60) Provisional application No. 60/929,209, filed on Jun. 18, 2007.

(51) Int. Cl.
*H04L 12/26* (2006.01)
(52) U.S. Cl. .................. 370/252; 370/389; 709/224
(58) Field of Classification Search .......... 370/229–235, 370/252, 253, 389, 392, 468; 709/223, 224
See application file for complete search history.

(56) References Cited

U.S. PATENT DOCUMENTS

| | | |
|---|---|---|
| 6,735,633 B1 | 5/2004 | Welch et al. |
| 2006/0136570 A1 | 6/2006 | Pandya |
| 2006/0227811 A1 | 10/2006 | Hussain et al. |
| 2006/0233101 A1 | 10/2006 | Luft et al. |
| 2008/0031141 A1 * | 2/2008 | Lean et al. .................. 370/241 |

OTHER PUBLICATIONS

International Search Report dated Nov. 10, 2008 for PCT/IL08/00829.

* cited by examiner

*Primary Examiner* — Pao Sinkantarakorn
(74) *Attorney, Agent, or Firm* — Eitan, Mehulal & Sadot

(57) ABSTRACT

A deep packet inspection (DPI) allocator for managing bandwidth in a communication channel, the DPI allocator comprising: a DPI application for inspecting data packets propagating to a destination via the channel that enter the allocator; and at least one service application for processing data packets that enter the allocator.

11 Claims, 8 Drawing Sheets

DPI MATRIX ALLOCATOR

PRIOR APPLICATIONS DATA

This patent application is a National Phase filing of, and claims priority and benefit from, PCT International Patent Application Number PCT/IL08/000829, titled "A DPI Matrix Allocator", filed on Jun. 18, 2008, published on Dec. 24, 2008 as International Publication Number WO 2008/155765, which is hereby incorporated by reference in its entirety; and which, in turn, claims priority and benefit from U.S. Provisional Patent Application No. 60/929,209, titled "A DPI Matrix Allocator", filed on Jun. 18, 2007, which is hereby incorporated by reference in its entirety.

FIELD

The invention relates to controlling data traffic in a communication network responsive to information generated by deep packet inspection.

BACKGROUND

Modern communication networks, such as for example, the Internet, are typically packet switched networks that transmit information between a source and a destination in streams of packets. A packet typically has a data payload section that comprises a portion of the information transmitted between the source and destination in a given communication session and a "housekeeping" part. The housekeeping part of a packet generally comprises management and control data used in transmitting the packet from its source to its intended destination and typically comprises a header and a tail. The header usually comprises an address for the packet destination as well as an address of the source. The addresses are used to route the packet from the source to its destination via a series of network nodes and during propagation to its destination, a packet's header is repeatedly inspected to determine how to configure the packet's route via the network nodes. Inspecting a packet's header is often referred to as "shallow inspection". The tail of a packet, as its name implies, marks the end of the packet.

However, providing subscribers to a communication network with an appropriate quality of service (QoS) for data transmission is not limited to providing and implementing routing techniques for stewarding data packets from sources to destination. A communication network has limited bandwidth, i.e. capacity, for transmitting data and providing satisfactory network QoS, generally requires providing, allocating and/or managing network bandwidth. Hereinafter providing, allocating and/or managing network bandwidth is generically referred to as "managing" network bandwidth and includes, by way of example among other bandwidth management functions, traffic shaping and/or policing.

In many conventional networks, deep packet inspection (DPI) techniques are used to provide bandwidth management. In using DPI, apparatus, hereinafter referred to as a "DPI allocator", comprising a suite of bandwidth management functions is connected in series with a communication channel, hereinafter referred to as a "bandwidth monitored (BWM) channel", of the network, so that data packets that are transmitted through the BWM channel pass through the DPI allocator. At least one of the bandwidth management functions operates to inspect packets that enter the DPI allocator. However, the DPI allocator inspects not only the headers of packets (shallow packet inspection) but also inspects their data payloads (Deep Packet Inspection) to determine what is referred to as a layer 7 identification, hereinafter referred as an "ID", which identifies a packet by its source and destination addresses and ports, its protocol and an application that it implements. (A packet's source and destination addresses and ports and its protocol are conventionally referred to as the packets layer 4 identification. The addition of information regarding an application that a packet implements to the identification of a packet "upgrades" the identification from a layer 4 identification to a layer 7 identification.) The DPI allocator allocates available network bandwidth on the BWM channel to the packets responsive to their IDs and algorithms and/or management functions that generally operate to allocate bandwidth to subscriber applications where it is most needed and/or to subscriber applications for which subscribers are willing to pay a premium.

By way of example, a DPI allocator may be configured to perform DPI on packets to determine packet IDs from their respective data payloads, and therefrom, which packets are from peer to peer (P2P) file sharing applications, gaming applications, or VoIP applications. Responsive to the IDs, the DPI allocator may allocate a preferred amount of available bandwidth to the VoIP applications and gaming applications, and smaller amounts of bandwidth to P2P file sharing applications.

By way of another example, a DPI allocator may be configured to profile packets propagating along the BWM channel that pass through the DPI allocator and determine whether they contain requests from a subscriber for down-loading multimedia data from a service provider. In the event that the packets contain such request, the DPI allocator manages BWM bandwidth responsive to various management rules and agreements to support forwarding the request packets to the service provider and packets transmitted by the service provider in response to the requests back to the subscriber.

SUMMARY

An aspect of some embodiments of the invention, relates to providing a communication network having improved network bandwidth efficiency.

An aspect of some embodiments of the invention, relates to providing a communication network having improved latency.

An aspect of some embodiments of the invention, relates to providing a DPI allocator for use in a communication network that is advantageous for improving bandwidth efficiency of applications that provide services via the network. According to an aspect of some embodiments of the invention, the allocator is advantageous in improving network latency. According to an aspect of some embodiment of the invention, the allocator is advantageous in providing improved information with respect to data traffic in a communication network and in analysis of data traffic information.

The inventors have realized that data packets transmitted from a DPI allocator for processing by a network application can be utilized with improved bandwidth efficiency if the packets can be processed in the allocator rather than having to be transmitted to the application. The inventors have also realized that an allocator can usually generate data with respect to information traffic in a network that many applications do not or cannot generate efficiently and that this data can be used by network applications to improve services they provide.

Therefore, in accordance with an aspect of some embodiments of the invention, the DPI allocator comprises at least one, optionally subscriber, service application that resides inside the DPI allocator, which in prior art resides outside the allocator. When residing outside the allocator, in accordance with prior art, the at least one service application receives data packets that are required for its operation via a BWM channel managed by the allocator after they have passed through the allocator. The at least one application, hereinafter referred to as an "imported application", which conventionally resides outside of the allocator, is imported to become a "resident" application that resides "inside" the allocator. The imported application receives data packets that enter the allocator and are required for its operation via a communication channel internal to the allocator that does not use bandwidth of the BWM channel managed by the allocator. As a result, the imported "immigrant" application consumes substantially less BWM channel bandwidth and processing resources than it would were it a non-resident application residing outside of the allocator.

It is noted that "resident applications" refers to applications that exchange data packets that enter a DPI allocator over communication channels that do not consume bandwidth of the BWM channel managed by the allocator and that resident applications are of course not limited to imported applications. Resident applications comprise applications that are conventionally resident in an allocator, such as for example DPI and bandwidth management applications, as well as "new" applications that provide functions that were not known or used prior to the creation of the new applications.

By way of example, the at least one imported application comprises at least one of a P2P file sharing caching application, a URL Filtering application, a transcoding application, a compression application, a traffic acceleration application and/or one or more security engines. In some embodiments of the invention, the at least one imported application comprises a data add and drop (Add/Drop) application. An Add/Drop application receives packets from a same data stream and adds data to and/or drops data from the data stream. For example, the Add/Drop application may insert advertising material into and/or remove advertising material from a multimedia data stream.

In accordance with an embodiment of the invention, different resident applications process packets that enter the allocator substantially simultaneously. In some embodiments of the invention, packets from a same data stream are processed by a plurality of resident applications prior to being transmitted from the allocator.

By comprising a "suite" of resident service applications in a same allocator, in accordance with an embodiment of the invention, the allocator can be advantageous in providing relatively improved information with respect to data traffic in a communication network and improved analysis of the data. Different data and/or statistics provided by different resident applications can provide more, and more varied data, regarding the traffic and the data can be relatively easily processed, compared and correlated because it is acquired and resides at a same site, i.e. the allocator. As a result, processing the data can be performed substantially without consuming bandwidth of a network channel that is bandwidth managed by the allocator. The information generated by different applications can be shared using communication channels internal to the allocator that do not consume bandwidth of the channel. In addition, since the data is acquired at a same site, and optionally substantially simultaneously, temporal relationships between the data can be performed more easily and an improved "real time" image of data traffic provided.

An aspect of some embodiments of the invention relates to providing a modular DPI allocator that is relatively easily configured to provide different and different numbers of resident applications.

In accordance with an embodiment of the invention, the modular DPI allocator comprises at least one blade box configured to accommodate different numbers of blades that support resident applications. The at least one blade box is designed, optionally, to hard wire a blade inserted into the at least one box with communication channels required for functioning of the application or applications supported by the blade. However, it is noted that practice of the invention is not limited to applications that are hard-wired with communication channels. Blades optionally communicate via wireless communication channels. Nor is a modular DPI allocator in accordance with an embodiment of the invention limited to blades and blade box implementations. For example, a modular DPI allocator may comprise a plurality of optionally stand-alone circuits that communicate via wire and/or wireless communication channels.

In accordance with an embodiment of the invention, a plurality of DPI allocators, collectively referred to for convenience of presentation as a "compound DPI allocator", is coupled to provide DPI applications to a same BWM channel or plurality of BWM channels. DPI allocators in a compound allocator are referred to for convenience as "component" DPI allocators.

Component allocators comprised in a compound allocator may be connected in any of various architectures. For example, in some embodiments of the invention, a compound DPI allocator comprises nested DPI allocators. Optionally, component DPI allocators in a compound DPI allocator are connected in a series configuration. Optionally, component allocators are connected in a parallel configuration in which each component allocator can directly receive and transmit packets from the same at least one BWM channel. Optionally, component DPI allocators are connected in a star configuration and receive packets from and transmit packet to the same at least one BWM channel via a suitable mux-demux apparatus. Optionally, the component allocators are connected in a series configuration in which a packet received from the same the least one BWM channel by one component allocator propagates directly through all the component allocators.

Various, methods and devices may be used for controlling which DPI allocators comprised in a compound DPI allocator operate on packets and in coordinating reception and transmission of packets between the various component allocators and the at least one BWM channel. For example, a central "meta-controller" operating as a master controller that controls and monitors the controllers of each of the component DPI allocators, operating as slave controllers, may be used to control processing and transmission of packets received by a compound DPI allocator. Optionally, a controller of one of the component DPI allocators operates as a meta-controller, i.e. a master controller, to the other controllers of the other component controllers operating as slave controllers. In some embodiments of the invention, control of processing and transmission of packets is distributed, with no one component DPI allocator dominating. Each component DPI allocator addresses packets on which it operates for transmission to other component allocators as required. Optionally, transmission between component allocators is via a common internal data bus. Optionally, transmission between component allocators is via the at least one BWM that the compound DPI allocator manages.

There is therefore provided in accordance with an embodiment of the invention, a deep packet inspection (DPI) allocator for managing bandwidth in a communication channel, the DPI allocator comprising: a DPI application for inspecting data packets propagating to a destination via the channel that enter the allocator; and at least one service application for processing data packets that enter the allocator.

Optionally the DPI allocator comprises a first directing circuitry that directs packets received by the allocator for processing selectively to an application of the applications comprised in the allocator. Optionally, the first directing circuitry comprises a controller that configures the allocator to selectively determine which applications process packets received by the allocator. Optionally, the first directing circuitry comprises an ingress circuit for receiving packets which the controller configures to direct received packets selectively to applications.

In some embodiments of the invention, the DPI allocator comprises circuitry adapted to parse a stream of packets into component packet streams. Optionally, the first directing circuitry is configured to direct packets from different component streams selectively for processing by different applications.

In some embodiments of the invention, the DPI allocator comprises second directing circuitry that receives packets processed by an application and selectively transmits packets to the first directing circuitry or forwards the packets to its destination. Optionally, the controller configures the second directing circuitry to determine which packets the second directing circuitry transmits to the first directing circuitry and which the second directing circuitry forwards to their respective destinations.

Additionally or alternatively, the second directing circuitry optionally comprises an egress circuit. Optionally, the controller configures the egress circuit to selectively direct packets to the first directing circuitry or to their respective destinations.

In some embodiments of the invention, the at least one application comprises a URL filter application. In some embodiments of the invention, the at least one application comprises a compression application. In some embodiments of the invention, the at least one application comprises a caching application. Optionally, the caching application comprises a resident cache. In some embodiments of the invention, the at least one application comprises an add and drop (Add/Drop) application. In some embodiments of the invention, the at least one application comprises a transcoding application. In some embodiments of the invention, the at least one application comprises a traffic acceleration application. In some embodiments of the invention, the at least one application comprises a quality of service (QoS) application. In some embodiments of the invention, the at least one application comprises a security application.

There is further provided in accordance with an embodiment of the invention, a compound DPI allocator for managing bandwidth in at least one communication channel, the compound DPI allocator comprising a plurality of component DPI allocators according to any of the preceding claims.

Optionally, the at least one communication channel comprises a single communication channel to the Internet. Optionally, the at least one communication channel comprises a communication channel to the Internet for each component DPI allocator.

In some embodiments of the invention, the compound DPI allocator comprises an additional communication channel, which is different from the at least one communication channel, for transmission of packets between the component DPI allocators. Optionally, the communication channel comprises a data bus for transmission of packets between DPI allocators. Additionally or alternatively, the additional communication channel optionally comprises a switch configured to direct packets from a given component DPI allocator selectively to another component allocator of the plurality of component allocators. Optionally, the switch is configured to selectively direct packets from the given component DPI allocator directly to the at least one channel managed by the compound DPI allocator.

In some embodiments of the invention, the compound DPI allocator comprises a meta-controller that operates to configure the component DPI allocators to designate at least one particular component DPI allocator of the plurality of component DPI allocators for processing a given packet received by the compound DPI allocator. Optionally, the at least one particular component allocator comprises at least two component DPI allocators.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

Figure 1:
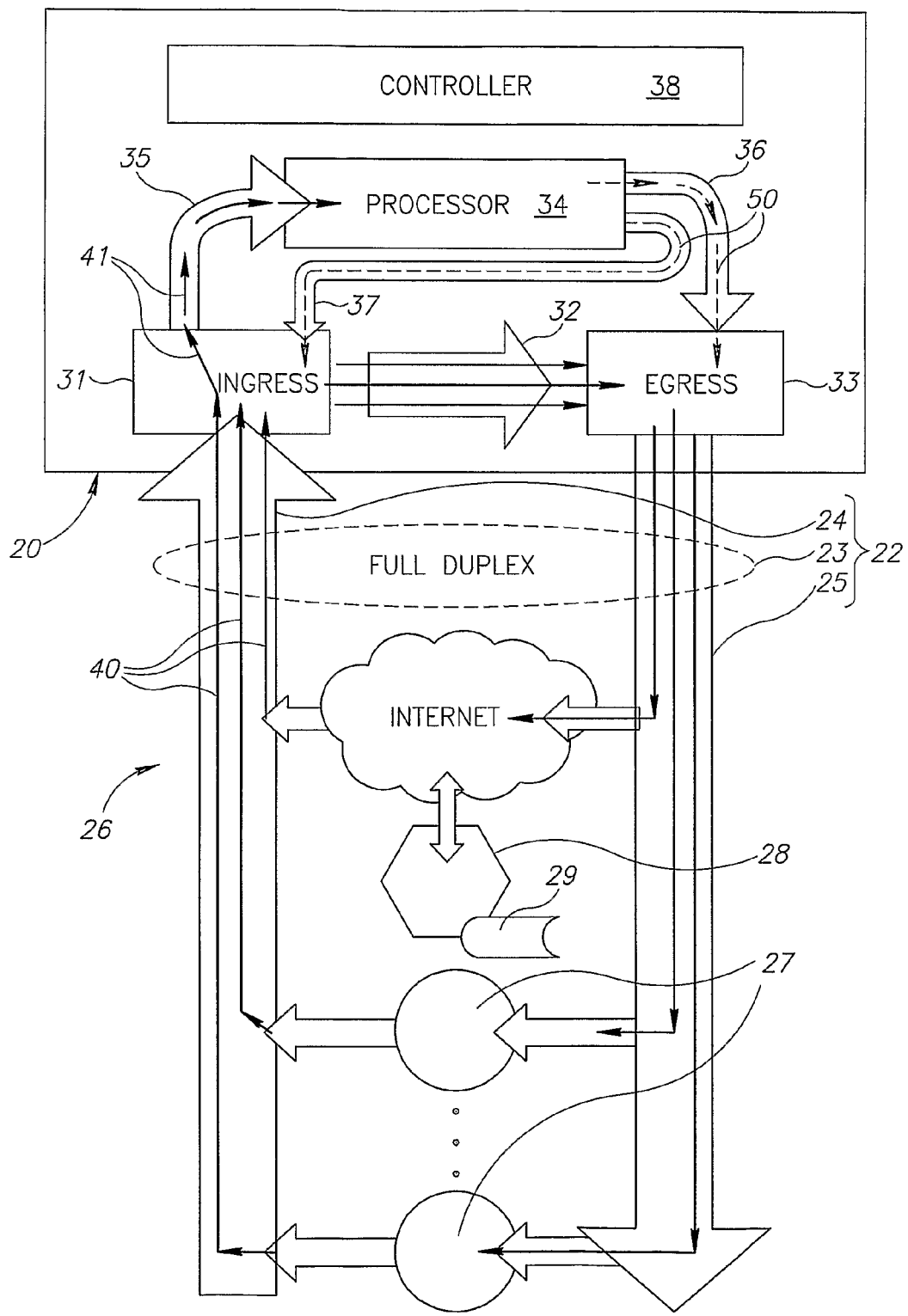
FIG. 1 schematically shows a DPI allocator connected inline to a communication channel of a network, in accordance with prior art.

FIG. 1 schematically shows a DPI allocator 20 coupled inline to a communication channel 22, i.e. a BWM channel; comprised in a communication network 26 that connects a plurality of subscribers 27 to the Internet to monitor the channel and manage channel bandwidth, in accordance with prior art. The Internet connects a plurality of subscribers and subscriber service providers via BWM channel 22 to subscribers. BWM channel 22 is optionally a full duplex channel represented schematically by an ellipse 23 encircling "simplex" input and output channels 24 and 25 respectively. For convenience of presentation only one service provider 28 is shown and the service provider is assumed to provide multimedia material optionally stored in a cache 29.

DPI allocator 20 comprises an ingress circuit 31 connected by a communication channel 32 to an egress circuit 33. All data packets that propagate through BWM channel 22 enter DPI allocator 20 via ingress circuit 31 propagate to egress circuit 33 via channel 32 and exit the DPI allocator via the egress circuit. DPI allocator 20 comprises a processor 34 for inspecting packets that enter DPI allocator 20, optionally performing deep packet inspection (DPI) on the packets, and using data that it generates from inspection to provide IDs (level 7 identifiers) for the packets. The processor is connected by a communication channel 35 to ingress circuit 31 for receiving packets and is connected by communication channels 36 and 37 for transmitting ID data that it generates to egress circuit 33 and ingress circuit 31 respectively. Optionally, DPI allocator 20 comprises a controller 38 that controls and manages operation of circuits in DPI allocator 20 and their functions.

Egress circuit 33 operates on the packets it receives responsive to ID data that it receives from processor 34 to manage bandwidth on BWM channel 22, optionally by traffic shaping and/or policing, to block unwanted packets, and/or to amend addresses on packets to forward them to a third party. Optionally, in managing bandwidth, egress circuit 33 shares management functions with processor 34 and typically performs QoS functions on packets.

Ingress circuit 31 operates on packets that it receives to determine which packets are "familiar" and which "unfamiliar". A familiar packet is a packet for which an ID has been established for the packet by DPI allocator 20. An unfamiliar packet is a packet for which an ID has not been established. Ingress circuit 31 sends a copy of an unfamiliar packet to processor 34 for inspection and generation of ID information. A copy of an unfamiliar packet is also transmitted to egress circuit 33 for bandwidth management and directing to its destination, optionally via a third party service provider, responsive to ID data generated by the processor. Ingress circuit 31 also, optionally, operates on ID data that it receives to block transmission of packets that are unwanted, for example, because they are a security risk.

FIG. 1 schematically shows data streams, represented by arrows 40, comprising packets entering ingress circuit 31, which are transmitted by subscribers 27 and Internet users for transmission over BWM channel 22. One of data streams 40 comprises unfamiliar packets and a copy, represented by arrows 41, of at least one of the packets is transmitted to processor 34 for generating ID data. Processor 34 generates ID data represented by dashed arrows 50 and transmits at least a portion of the ID data to egress and ingress circuits 31 and 33 via channels 36 and 37 respectively.

Figure 2:
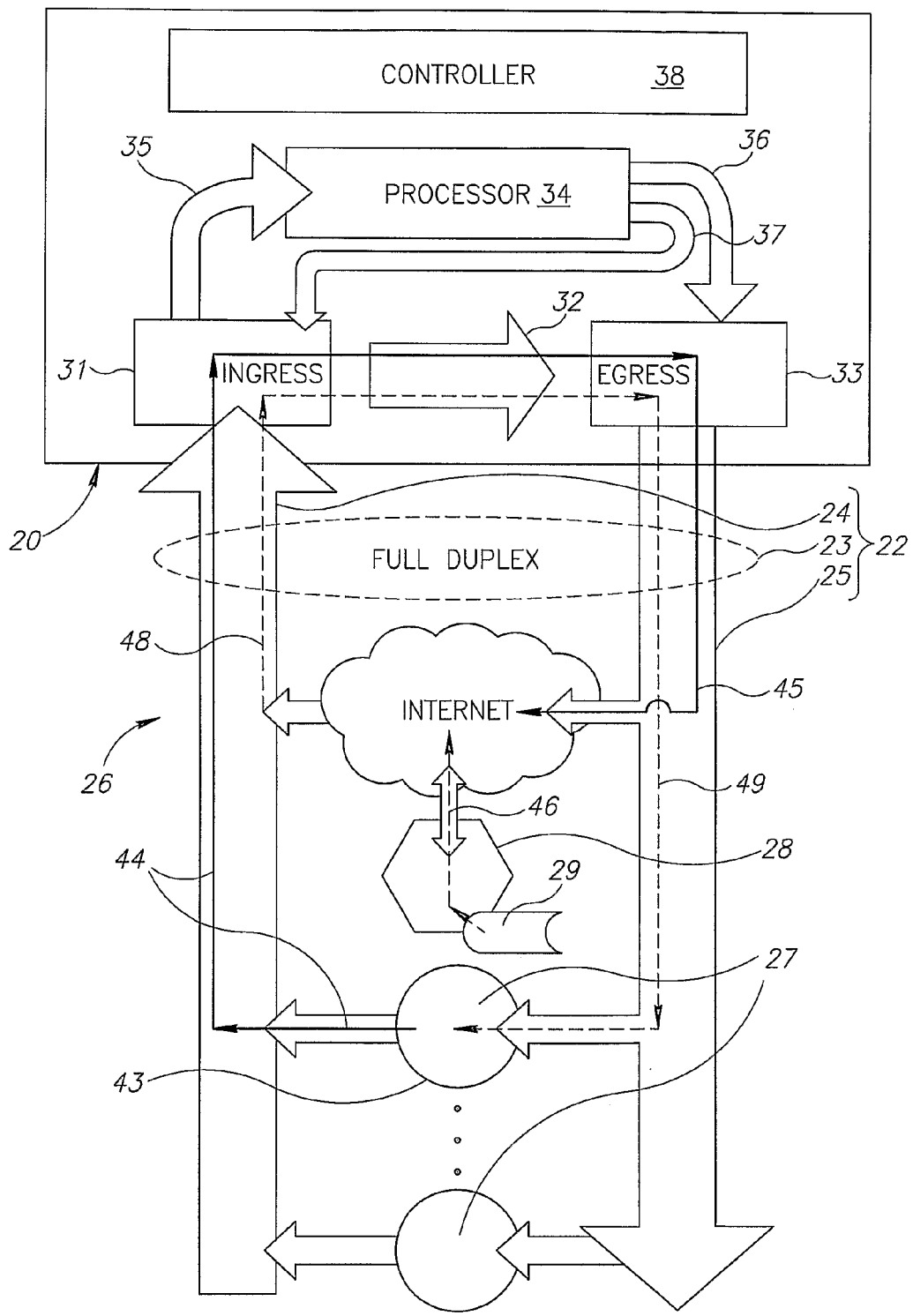
FIG. 2 schematically shows the DPI allocator of FIG. 1 operating to transmit a data stream in accordance with prior art.

FIG. 2 schematically illustrates an example of a communication scenario that might occur in network 26. A given subscriber 43 of the plurality of subscribers 27 is attempting to download multimedia data, for example a movie, from service provider 28. Subscriber 43 generates a request stream of data packets, represented by arrows 44, which is transmitted to ingress circuit 31. It is assumed that DPI allocator 20 has already encountered request data packets from subscriber 43, the packets are familiar and processor 34 has not generated ID data for the packets that would instruct ingress circuit 31 to block their transmission. As a result, the packets are forwarded to egress circuit 33, which manages their transmission responsive to their ID, available bandwidth, and priority and transmits them in a data stream represented by arrow 45 to access service provider 28 via the Internet. Service provider 28 responds by accessing portions of the requested movie from cache 29 and transmits the movie portions in a data stream 46 comprising packets addressed for subscriber 43 to the Internet. The Internet forwards the data stream to the subscriber via BWM channel 22 as data stream 48 that enters ingress circuit 31. The ingress circuit recognizes that the packets in data stream 48 are familiar, are a response to the request packets transmitted by subscriber 43 and forwards the data packets to egress circuit 33. The egress circuit bandwidth manages the response packets and transmits them in a data stream 49 to subscriber 28.

Figure 3:
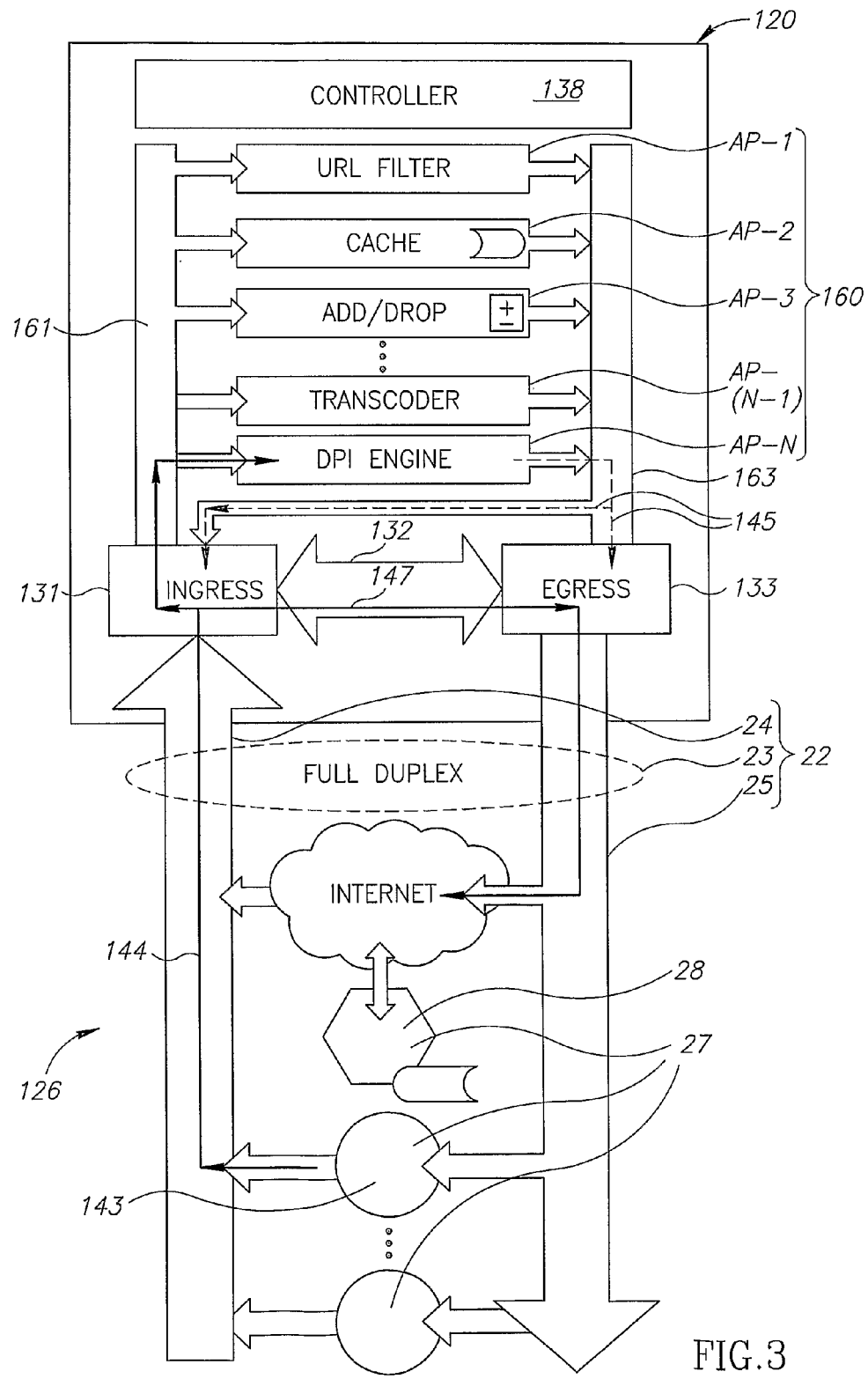
FIG. 3 schematically shows a DPI allocator having a plurality of resident service applications connected inline to a communication channel of a network, in accordance with an embodiment of the invention.

FIG. 3 schematically shows a DPI allocator 120, in accordance with an embodiment of the invention. DPI allocator 120 is comprised in a communication network 126 similar to communication network 26 and is coupled in series with full duplex communication channel 22 that connects subscribers 27 to the Internet.

DPI allocator 120 comprises a controller 138 for controlling allocator functions, an ingress circuit 131, an egress circuit 133 and a communication channel 132 that connects the ingress and egress circuits. It is noted that in prior art DPI allocator 20 (FIG. 1, FIG. 2), communication channel 32 carried data packets only in a direction from ingress circuit 31 to egress circuit 33. In accordance with an embodiment of the invention, as discussed below, communication channel 132 that connects ingress circuit 131 and egress circuit 133 carries data packets in both directions between the ingress and egress circuits.

In place of, or in addition to, processor 34 comprised in prior art DPI allocator 20 (FIG. 1, FIG. 2) that provides DPI and optionally management functions, DPI allocator 120 comprises a processor or processors that provide a bank of selectable applications 160 individualized by alphanumerics AP-1, AP-2 . . . AP-N. In accordance with an embodiment of the invention, applications 160 comprise DPI inspection provided by a DPI Engine (AP-N) and at least one service application "imported" to be a "resident" application, which in prior art was non-resident and communicated with subscribers via BWM channel 22. Optionally, an input "manifold" communication channel 161 couples inputs of applications 160 to ingress circuit 131 and an output manifold communication channel 163 couples outputs of the applications to egress circuit 133.

By way of example, selectable applications 160, optionally comprise resident service applications that provide URL Filtering, (URL Filter AP-1), caching (Cache AP-2) from and to a resident cache, insertion and/or excision of data from a data stream (Add/Drop (AP-3), and transcoding (Transcoder AP-(N-1)). (A resident cache comprises a cache from which DPI allocator 120 can move data in the cache to BWM channel 22 over a communication link that does not consume bandwidth of the BWM channel.) It is noted that the alphanumerics used to indicate specific applications 160 are also used to designate hardware and/or processors that provide the applications and are designations of convenience which of course do not imply any hierarchical order or grading.

In some embodiments of the invention, selectable applications 160 comprise an application that performs a function conventionally performed by an egress circuit. For example, a QoS function performed by an egress circuit in accordance with prior art may, in accordance with an embodiment of the invention, be performed by a selectable application AP-1, AP-2 . . . or AP-N. In some embodiments of the invention, an egress circuit, such as egress circuit 133, is a relatively "atrophied" egress circuit that functions substantially only as an interface between DPI allocator 120 and BWM 22 and is excised of most switching and/or bandwidth management functions. The excised functions are performed selectively as required by at least one application comprised in selectable applications 160.

In an embodiment of the invention, ingress circuit 131 operates not only to direct unfamiliar packets to DPI Engine AP-N or forward familiar packets directly to egress circuit as required, but it also operates to direct packets selectively to any of applications 160 or combination of the applications responsive to packet IDs and desired service processing configurations. For example, ingress circuit 131 may optionally be configured to direct a data stream carrying multimedia data to URL Filter AP-1 to block streaming of pornography, optionally, based on URL address. Alternatively, packets in a data stream may be directed to Add/Drop AP-3 to add and/or remove material from a data stream. For example, Add/Drop AP-3 might be configured to remove advertising from a multimedia data stream and replace it with different advertising material. A data stream received encoded in accordance with a format of a first codec may be directed by ingress circuit 131 to Transcoder AP-(N-1) to be translated into a format of a second codec. In an embodiment of the invention, following processing by an application 160, data packets are transmitted to egress circuit 133.

In FIG. 3 DPI allocator 120 is schematically shown operating in accordance with an embodiment of the invention and directing copies of unfamiliar data packets from a data stream 144 received from a subscriber 143 of subscribers 27 to DPI Engine AP-N. ID data, represented by dashed arrows 145, generated by DPI Engine AP-N for the packets is transmitted to ingress and egress circuits 131 and 133 for use in managing and directing the packets. Packets in data stream 144 for transmission to the Internet are forwarded from ingress circuit 131 to egress circuit 133 via channel 132 as indicated by a line 147.

Figure 4:
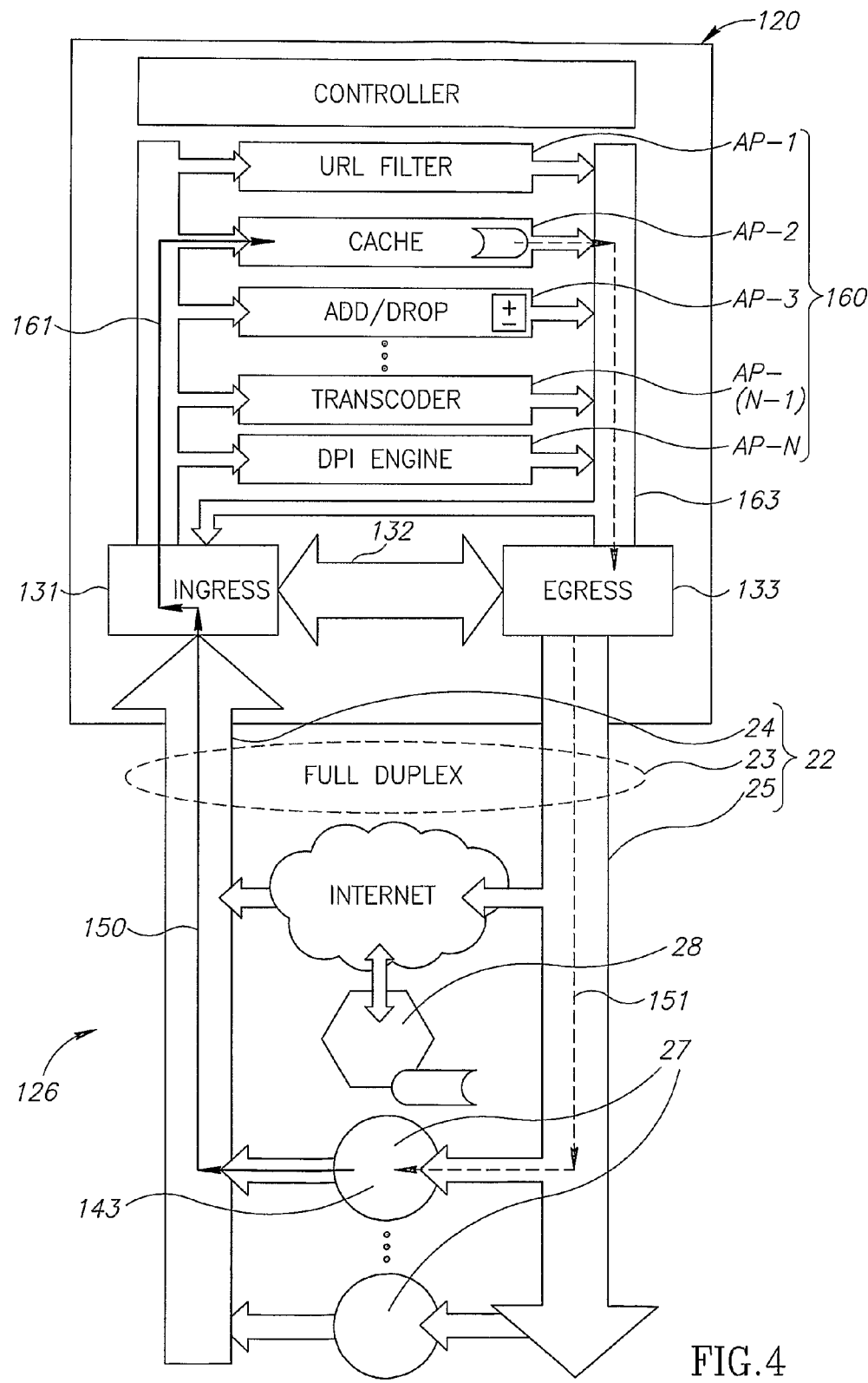
FIG. 4 schematically shows the DPI allocator shown in FIG. 3 operating to compress a data stream using a resident service application, in accordance with an embodiment of the invention.

By way of another example, FIG. 4 schematically shows DPI allocator 120 operating to provide multimedia data from cache application AP-2 to a subscriber 143. Subscriber 143 is shown transmitting a data stream 150 comprising packets requesting portions of the multimedia material that the subscriber wants to ingress circuit 131. Ingress circuit 131 recognizes that the packets in data stream 150 are familiar and are requests for multimedia material stored by cache application AP-2 and forwards the request to the cache application. Cache application AP-2 transmits the requested data to egress circuit 133 via output communication channel 163. The egress circuit transmits the multimedia data, subject to bandwidth management constraints, in a data stream 151 to the subscriber.

It is noted that in providing multimedia data to subscriber 143 by providing a resident caching application, in accordance with an embodiment of the invention, bandwidth consumed in providing the data is reduced relative to bandwidth consumed in prior art.

By way of another example of a configuration of a DPI allocator in accordance with an embodiment of the invention that can result in bandwidth savings, it is noted that prior art allocators may forward a data stream received for transmission to a given destination to a third party that compresses the data stream on its way to the destination. In accordance with an embodiment of the invention, an allocator comprises a resident compression application. A data stream from a source to a destination that enters the allocator and is to be compressed, is compressed in the allocator rather than by a third party as in prior art. As a result, bandwidth, which in prior art is consumed in transmitting the data stream to a third party "compressor" is saved.

In an embodiment of the invention, ingress circuit 131 is configured to parse a stream of data packets into component streams and direct different component streams to be processed substantially simultaneously by a plurality of different applications. For example, ingress circuit 131 may receive a "compound" data stream comprising packets from first, second and third component streams. The ingress circuit optionally parses the compound data stream into the component data streams and directs each data stream to a different application 160.

Egress circuit 133 in accordance with an embodiment of the invention, is configured not only to bandwidth manage packets it receives and transmit the packets to BWM channel 22, and/or optionally, to block packets. The egress circuit is also configured, in accordance with an embodiment of the invention, to direct packets back to ingress circuit 131 via channel 132 so that if desired, they can be processed by another application of the plurality of resident applications. Parsing by ingress circuit 131 optionally comprises merging data that the ingress circuit receives from BWM channel 22 and from egress circuit 133 via channel 132 and parsing the merged data stream.

Figure 5:
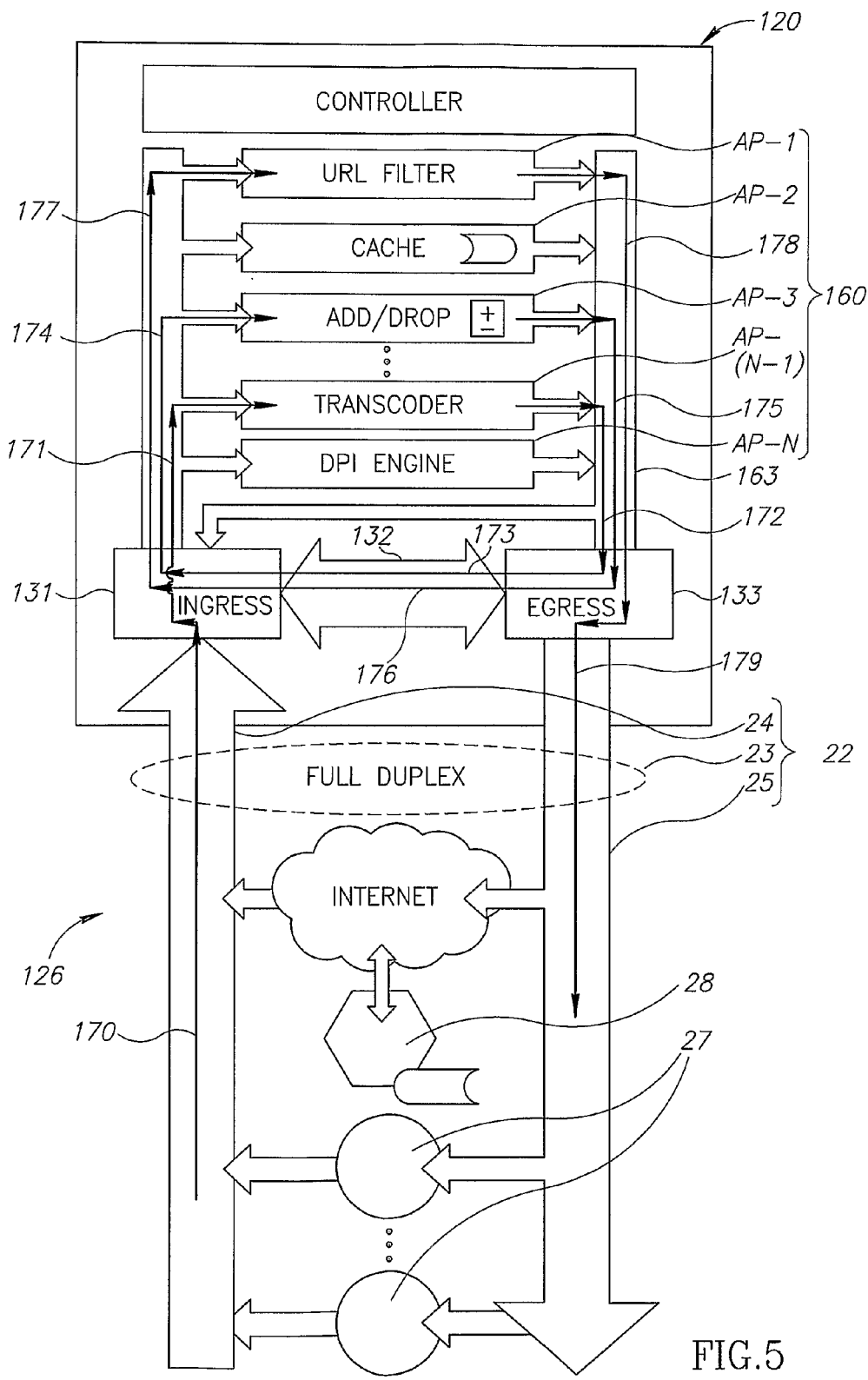
FIG. 5 schematically shows the DPI allocator of FIG. 3 operating to process a data stream with a plurality of different resident service applications, in accordance with an embodiment of the invention.

FIG. 5 schematically shows DPI allocator 120 operating to cycle packets from a data stream 170 through a plurality of different applications 160, in accordance with an embodiment of the invention.

Data stream 170 is assumed to originate from service provider 28 via the Internet and by way of example to comprise multimedia data for children encoded in accordance with a first codec that is not compatible with multimedia equipment, for example, a mobile handheld communicator, for which it is intended. Packets in data stream 170 are assumed to be familiar and upon entering ingress circuit 131 are first directed, as indicated by arrows 171, by the ingress circuit to Transcoder application AP-(N-1) for transcoding data in the packets to a codec format compatible with the intended multimedia equipment. Following processing by Transcoder application AP(N-1), the processed data stream is transmitted, as indicated by arrow 172, to egress circuit 133. The egress circuit has been programmed responsive to ID data generated previously by DPI Engine AP-N to return (arrow 173) the packets to ingress circuit 131 via communication channel 132. The ingress circuit, also programmed responsive to ID data provided by DPI Engine AP-N, directs (arrow 174) the packets it receives, to Add/Drop application AP-3 to insert advertisements for toys. After processing by Add/Drop application AP-3 the packets are returned (arrow 175) to egress circuit 133 which again returns (176) the packet to ingress circuit 131. The ingress circuit directs (arrow 177) the packets to URL Filter application AP-1 for removing pornographic material. Thereafter, the packets are again transmitted (arrow 178) to egress circuit 133. This time, the egress circuit forwards (arrow 179) the processed multimedia data toward subscribers for whom it might be intended via BWM channel 22. Optionally, the material is cached first by Cache application AP-2 before being output from DPI allocator 120. It is noted that whereas egress circuit 133 "returns" packets to ingress circuit 131 via a same channel that the ingress circuit transmits packets to the egress circuit for forwarding to a destination, in some embodiments of the invention an allocator comprises a dedicated channel different from channel 132 for transmission of packets from the egress circuit to the ingress circuit.

By way of another example, in some embodiments of the invention a DPI allocator similar to DPI allocator 120 in accordance with an embodiment of the invention comprises a plurality of different resident security expert applications. For example, the DPI allocator may have a suite of resident security expert application optionally comprising a "deworming" application, an antivirus application and an IPS/IDS (Intrusion Prevention System/Intrusion Detection System). Upon receiving a data stream, the DPI allocator optionally cycles packets from the data stream through a security expert application or a combination of security expert applications from the suite.

It is noted that conventionally, third party service providers provide security services and data for security processing is generally transmitted from an allocator to a third party. The third party will often be characterized by expertise in a specific security threat and for processing to deal with more than one type of security threat, different third parties are required to process the data. To provide appropriate security protection, third parties will usually transmit data between themselves to provide a complete suite of security checks. Transmitting the data between a plurality of different experts, each with its own latency, can generate a relatively large and undesirable latency. By processing data streams to remove or ameliorate security threats using a suite of expert applications resident in a same DPI allocator, in accordance with an embodiment of the invention, the processing can be performed with improved efficiency and reduced latency.

Whereas in the above discussion third party compression and security services are described as imported into a DPI allocator, any conventional service typically provided by a third party may of course be imported to become a resident application of a DPI allocator, in accordance with an embodiment of the invention.

It is noted that whereas DPI allocator 120 is shown in FIGS. 3-5 having a particular architecture, a DPI allocator in accordance with an embodiment of the invention is not limited to the architecture shown for allocator 120. Any suitable architecture that is configured to comprise imported applications and enables such applications to selectively be controlled to process packets, may be used in the practice of the invention.

Figure 6:
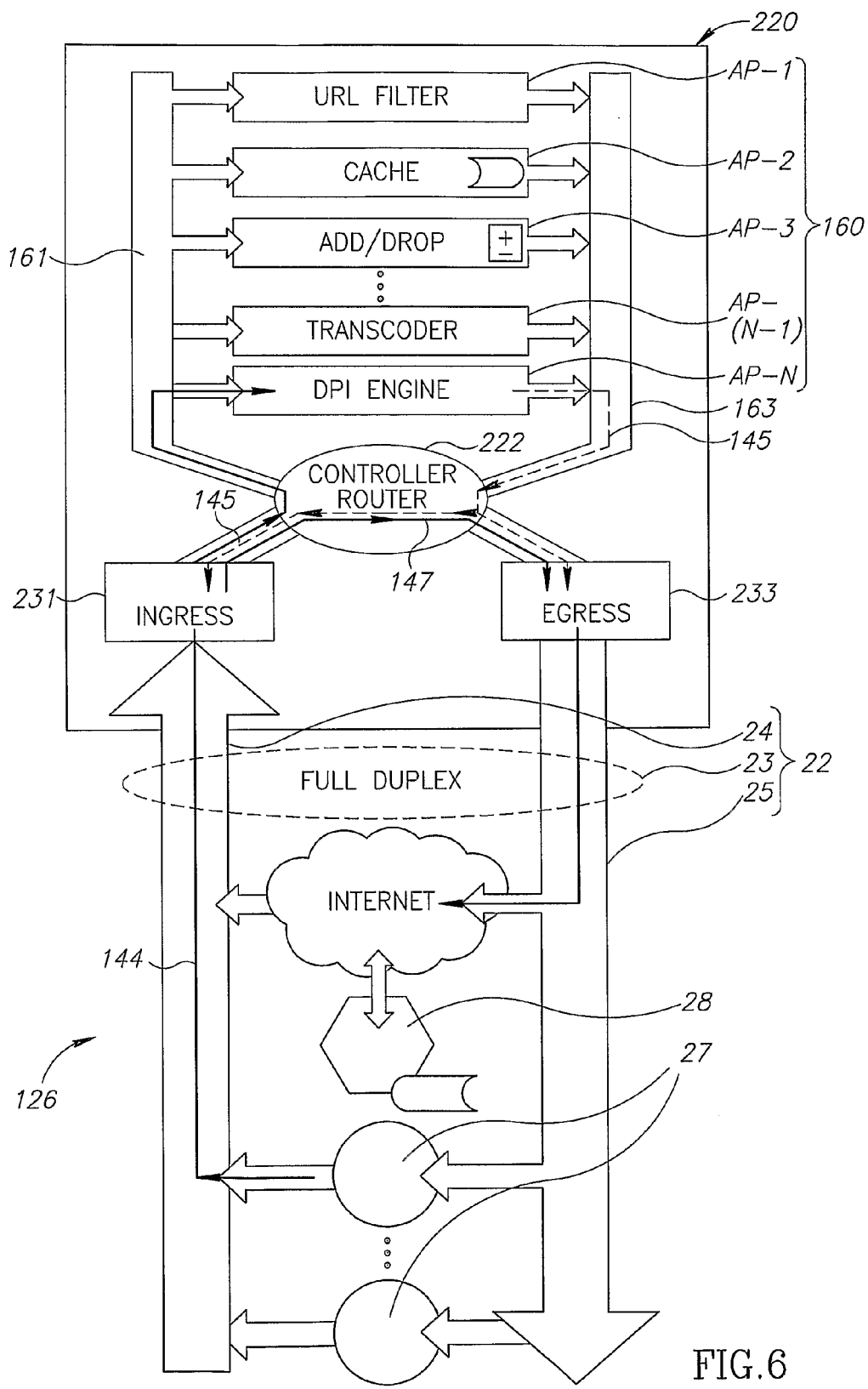
FIG. 6 schematically shows a DPI allocator in accordance with an embodiment of the invention having architecture different from that of the DPI allocator shown in FIGS. 3-5.

FIG. 6 schematically shows a DPI allocator 220 in accordance with an embodiment of the invention having architecture different from that of DPI allocator 120. In FIG. 6, DPI allocator 220 is shown operating to perform the functions performed by DPI allocator 120 shown in FIG. 3. DPI allocator 220 comprises ingress and egress circuits 231 and 233 respectively and selectable applications 160 coupled to input and output communications channels 161 and 163. Optionally, selectable applications 160 in DPI allocator 220 are the same as the selectable applications 160 comprised in DPI allocator 120. However, whereas in DPI allocator 120, input and output channels 161 and 163 are directly connected to ingress and egress circuits 131 and 133 respectively, in DPI allocator 220 input and output channels 161 and 163 are connected to a controller-switching circuit 222.

Controller-switching circuit 222 optionally performs all routing of packets inside DPI allocator 220 once they have entered the allocator via ingress circuit 231. Optionally, all packets that enter DPI allocator 220 are transmitted by ingress circuit 231 to controller-switching circuit 222. Optionally, the controller-switching circuit sequentially routes each packet it receives to the various applications 160 required for it's processing, receiving the packet following each time it is processed by an application 160. Following processing by the various applications 160, controller-switching circuit 222 forwards the packet to egress circuit 233 for transmission to BWM output channel 25. If the packet does not require processing by an application 160, controller-switching circuit 222 routes the packet directly to egress circuit 233.

Whereas in DPI allocator 220 applications 160 are coupled by "manifold" input and output channels 161 and 163 to controller-switching circuit 222, in some embodiments of the invention, each application is connected by its own dedicated channel to the controller-switching circuit.

In some embodiments of the invention, a DPI allocator is a compound allocator comprising a plurality of component allocators. Optionally, the compound allocator comprises a first DPI allocator and at least one nested DPI allocator.

Figure 7A:
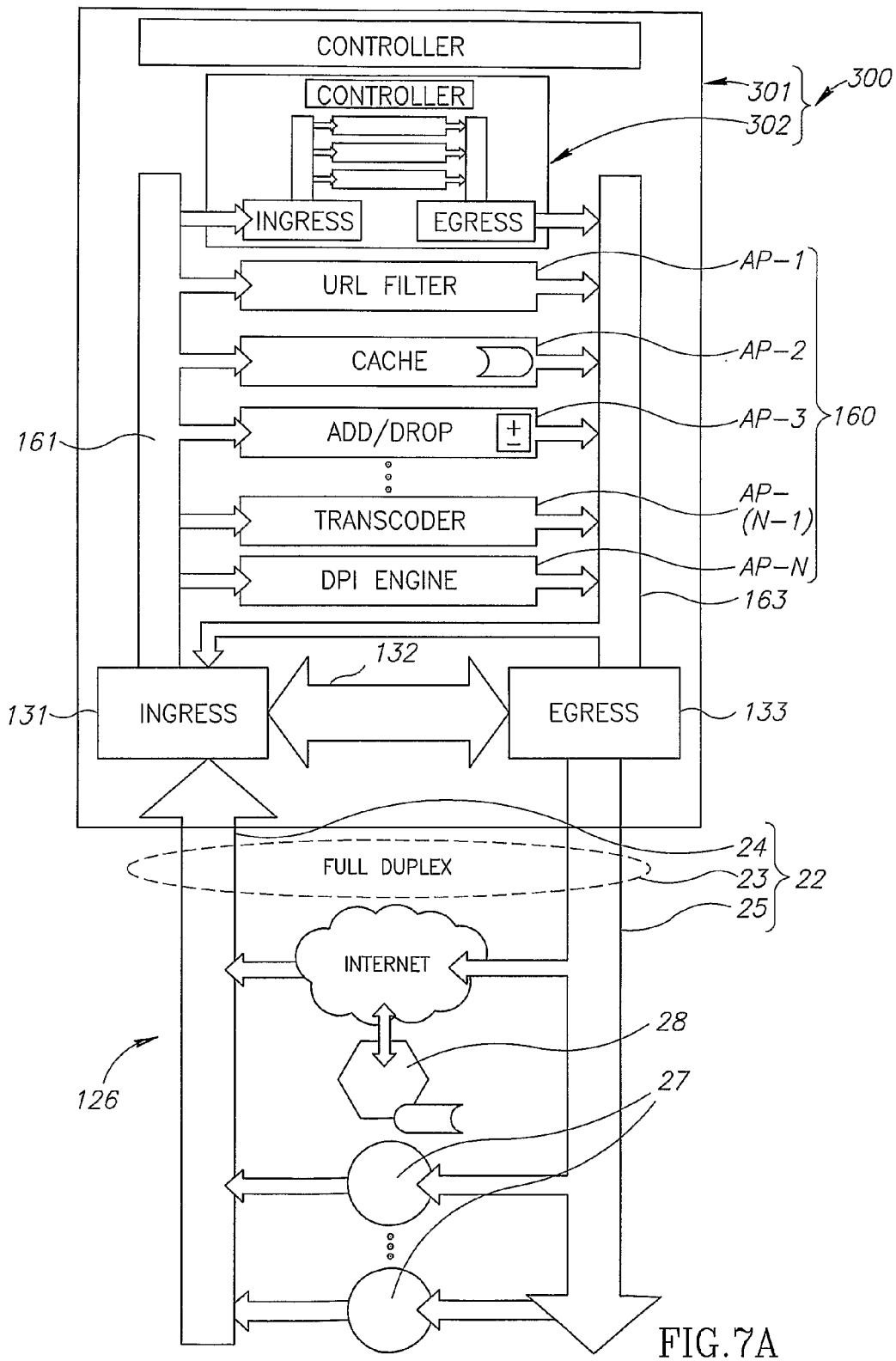
FIGS. 7A and 7B schematically show compound DPI allocators, in accordance with embodiments of the invention.

FIG. 7A schematically shows a compound allocator 300 comprising a first allocator 301 and a second allocator 302 nested in the first allocator, in accordance with an embodiment of the invention. By way of example, first DPI allocator 301 is identical to DPI allocator 120 (FIG. 3) with the addition of nested allocator 302. Optionally, nested allocator 302 is identical to allocator 120.

Figure 7B:
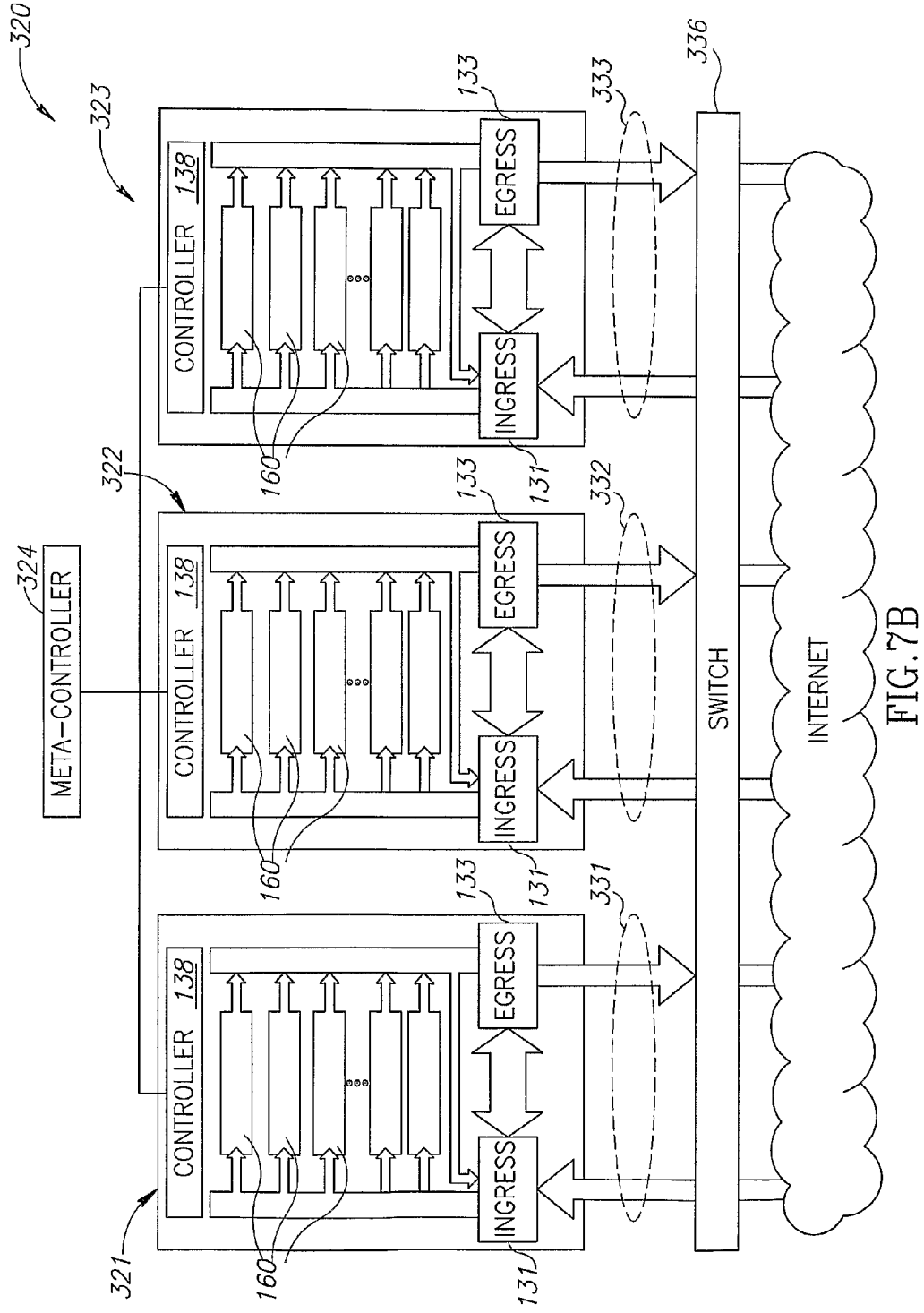

In some embodiments of the invention, a compound DPI allocator comprises a plurality of connected allocators. FIG. 7B schematically shows a compound DPI allocator 320 comprising a plurality of, optionally, three component DPI allocators 321, 322 and 323. Optionally, allocators 321-323 are similar to DPI allocator 120 (FIG. 3), each comprising a controller 138 and a plurality of selectable applications 160. Optionally, at least one component DPI allocator 321-323 comprises at least one application 160 that is not comprised in at least one of the other component DPI allocators 321-323.

Component DPI allocators 321-323 are optionally coupled to their own full duplex BWM channels 331, 332 and 333 respectively for communication to and from the Internet. Optionally, channels 331-333 are connected to the Internet by a switch 336. Switch 336 is configured to connect channels 331-333 to the Internet as required and to connect the channels for transmitting packets between component DPI allocators 321-323. Any of various switches and switching methods may be used to provide switch 336. For example, switch 336 may comprise a bi-directional data bus and/or a mux-demux switch.

Optionally, a meta-controller 324 is connected to and operates as a master controller to controllers 138 of component DPI allocators 321-323. Meta-controller 324 communicates with and oversees controllers 138 in the component DPI allocators to manage processing of packets by the compound DPI allocator and transmission of the packets between the component DPI allocators and between the component DPI allocators and the Internet. Optionally the meta-controller acquires data from each of controllers 138 to generate communication data and statistics advantageous for managing BWM channels 331-333.

By way of example of communication between component DPI allocators 321-323, assume that a packet enters DPI allocator 321 from the Internet via channel 331. Assume further that meta-controller 324 has configured compound DPI allocator 320 so that packets of the type assumed to have entered DPI allocator 321 are to be processed by designated applications in both component DPI allocator 321 and component DPI allocator 323. Upon entering ingress circuit 131 of component DPI allocator 321, controller 138 of the component allocator controls the designated application or applications 160 in the allocator to process the packet. Upon completion of processing in component DPI allocator 321 controller 138 in the allocator controls a suitable application 160 and/or egress circuit 133 to tag the packet with a control code. The control code indicates that the packet is to be transferred via data bus or channel 336 to component DPI allocator 323 and which applications 160 in component DPI allocator 323 are to process the packet. Upon completion of processing in component DPI allocator 323, optionally, egress circuit 133 in the component DPI allocator codes and addresses the packet for return to the Internet and its next destination.

Whereas compound DPI allocator 320 comprises a meta-controller, i.e. a master controller, for controlling operation of the compound DPI allocator, in some embodiments of the invention, a controller 138 operates as a master meta-controller. Optionally, the controller 138 operating as a met-controller communicates with the other controllers via a bi-directional data bus, such as data bus 336 shown in FIG. 7B. It is further noted that whereas in DPI allocator 320 component allocators optionally communicate via a data bus or channel 336 in some in some embodiments of the invention communication between component DPI allocators is effected via the at least one BWM channel that they manage.

Other management configurations may of course be used to control processing packets that enter a compound DPI allocator, such as a DPI allocator similar to DPT allocator 320 in accordance with an embodiment of the invention. For example, control may be distributed among the controllers, e.g. controllers 138, of the plurality of controllers in the component allocators. The controller in a component DPI allocator in the compound allocator that receives and/or processes a packet may optionally address the packet for processing by a next at least one component DPI allocator in the compound allocator.

A DPI allocator, in accordance with an embodiment of the invention, can provide not only improved bandwidth management and latency but can be advantageous to provide improved data for performing services and bandwidth management. For example, a suit of security expert applications resident in a same allocator can provide better statistics regarding security threats than a plurality of dispersed third party experts that perform the same security processing. For example, data generated by different resident security expert applications may be relatively easily cross correlated to determine threat patterns that can be advantages in warding off threats.

Without being limited by any particular model that may be used to describe operation of a DPI allocator in accordance with an embodiment of the invention, it is noted that operation of an allocator, in accordance with an embodiment of the invention may be described for some operations that it performs by matrix algebra. For example, a data stream parsed into component data streams by an ingress circuit, such as ingress circuit 131 (FIGS. 3-5) in accordance with an embodiment of the invention, may be considered to be a "data" column vector whose elements are the data stream components. Each resident application 160 of DPI allocator 120 may be considered to be an element of an "application" matrix. Processing the different data stream components may be modeled as multiplication of the data vector by the application matrix. In general, an application matrix is a diagonal matrix, but off diagonal elements can be generated by processing a same component data stream with different applications or different component data streams with a same application. A DPI allocator, in accordance with an embodiment of the invention may be considered to be a "matrix service gateway allocator" that provides a matrix of service applications for processing data streams.

In the description and claims of the present application, each of the verbs, "comprise" "include" and "have", and conjugates thereof, are used to indicate that the object or objects of the verb are not necessarily an exhaustive listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

The invention claimed is:

1. A Deep Packet Inspection (DPI) allocator, the DPI allocator comprising:
   a DPI application for inspecting data packets propagating to a destination via a channel that enters the DPI allocator;
   at least one service application for processing data packets that enter the DPI allocator, wherein the DPI allocator is to manage bandwidth in a communication channel;
   a first directing circuitry to direct packets received by the DPI allocator for processing selectively to an application of the applications comprised in the DPI allocator, wherein the first directing circuitry comprises a controller to configure the DPI allocator to selectively determine which applications process packets received by the DPI allocator, wherein the first directing circuitry further comprises an ingress circuit to receive packets which the controller configures to direct received packets selectively to applications, wherein the first directing circuitry is to direct packets from different component streams selectively for processing by different applications;
   a second directing circuitry to receive packets processed by an application and to selectively transmit packets to the first directing circuitry or to forwards the packets to their destination; and
   circuitry to parse a stream of packets into component packet streams.

2. The DPI allocator according to claim 1, wherein the controller is to configure the second directing circuitry to determine which packets the second directing circuitry is to transmit to the first directing circuitry and which packets the second directing circuitry is to forward to their respective destinations.

3. The DPI allocator according to claim 2, wherein the second directing circuitry comprises an egress circuit.

4. The DPI allocator according to claim 3, wherein the controller is to configure the egress circuit to selectively direct packets to the first directing circuitry or to their respective destinations.

5. The DPI allocator according to claim 4, wherein the at least one application comprises an application selected from the group consisting of:
   a URL filter application;
   a compression application;
   a caching application;
   a caching application having a resident cache;
   an add and drop (Add/Drop) application;
   a transcoding application;
   a traffic acceleration application;
   a Quality of Service (QoS) application;
   a security application.

6. A compound Deep Packet Inspection (DPI) allocator comprising:
   a plurality of component DPI allocators,
   wherein each one of at least two of the plurality of component DPI allocators comprises:
      a DPI application for inspecting data packets propagating to a destination via a channel that enters the DPI allocator; and at least one service application for processing data packets that enter the DPI allocator, wherein the compound DPI allocator is to manage bandwidth in at least one communication channel;

wherein the compound DPI allocator comprises an additional communication channel, which is different from the at least one communication channel, for transmission of packets between the component DPI allocators;

wherein the additional communication channel comprises a data bus for transmission of packets between the component DPI allocators;

wherein the additional communication channel comprises a switch to direct packets from a given component DPI allocator selectively to another component DPI allocator of the plurality of component DPI allocators.

7. The compound DPI allocator according to claim 6, wherein the at least one communication channel comprises a single communication channel to the Internet.

8. The compound DPI allocator according to claim 6, wherein the at least one communication channel comprises a communication channel to the Internet for substantially each component DPI allocator.

9. The compound DPI allocator according to claim 6, wherein the switch is to selectively direct packets from the given component DPI allocator directly to the at least one channel managed by the compound DPI allocator.

10. The compound DPI allocator according to claim 6, comprising:
    a meta-controller to configure the component DPI allocators, and to designate at least one particular component DPI allocator of the plurality of component DPI allocators for processing a given packet received by the compound DPI allocator.

11. The compound DPI allocator according to claim 10, wherein the at least one particular component DPI allocator comprises at least two component DPI allocators.

* * * * *